Patented Mar. 25, 1924.

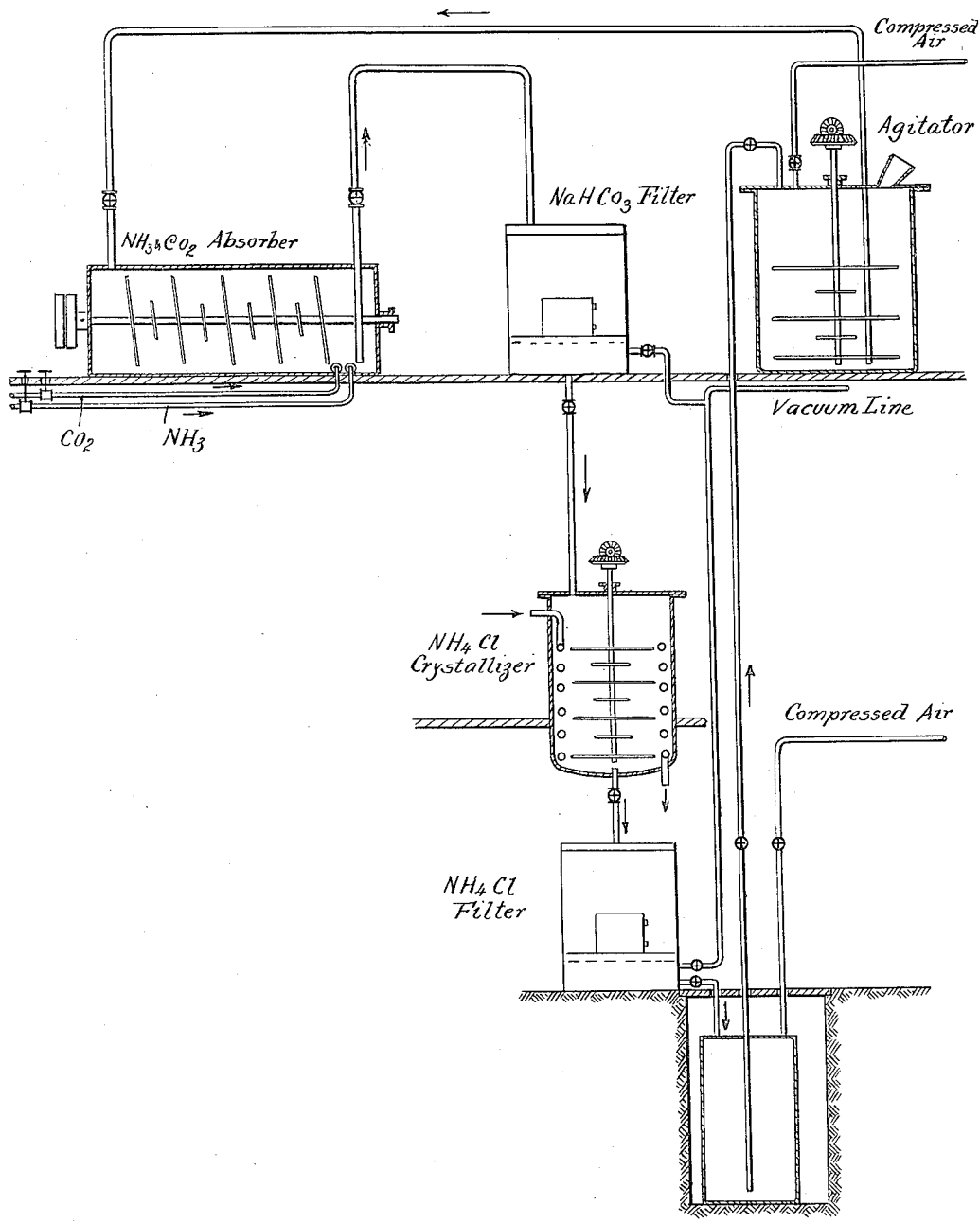

1,488,002

UNITED STATES PATENT OFFICE.

GEORGES CLAUDE, OF PARIS, FRANCE, ASSIGNOR TO SOCIETE L'AIR LIQUIDE SOCIETE ANONYME POUR L'ETUDE ET L'EXPLOITATION DES PROCEDES GEORGES CLAUDE, OF PARIS, FRANCE.

ALTERNATE PRECIPITATION OF SODIUM BICARBONATE AND AMMONIUM CHLORIDE.

Application filed March 15, 1921. Serial No. 452,476.

*To all whom it may concern:*

Be it known that I, GEORGES CLAUDE, a citizen of France, residing at Paris, France, have invented certain new and useful Improvements in the Alternate Precipitation of Sodium Bicarbonate and Ammonium Chloride; and I do hereby declare the following to be a full, clear, and exact description of the invention, such as will enable others skilled in the art to which it appertains, to make and use the same.

This invention relates to the manufacture of sodium bicarbonate and ammonium chloride, and has for its object the provision of a simple and effective method of alternately precipitating these compounds from the mother liquor in which they are produced by relatively simple reactions when suitable quantities of gaseous ammonia and of sodium chloride are added thereto.

A further object of the invention is the provision of a method of preparing sodium bicarbonate and ammonium chloride in which the heat released during the reaction is effectively employed.

Further objects and advantages of the invention will be apparent as it is better understood by reference to the following specification in which the preferred embodiment of the invention is described, it being understood that numerous variations may be introduced thereto without departing from the invention as will be readily apparent to those skilled in the art.

A process has been suggested heretofore for the manufacture of sodium bicarbonate and ammonium chloride by precipitation from the same mother liquor, and, in order that the advantages of the present process may be clearly understood, reference is made to the prior process, the details of which follow. The hot mother liquor remaining at the conclusion of the cycle, and containing ammonium chloride and some sodium chloride, is, after filtration, fortified with gaseous ammonia and a suitable quantity of sodium chloride. The solution is then carbonated while the temperature is maintained at a suitable point, but carbonation is arrested at the formation of ammonium mono-carbonate. The solution is cooled with agitation to a temperature of from 5 to 10° C. and ammonium chloride is thus precipitated, and is thereafter separated by filtration. The cold solution is then reheated to substantially 40° C. with the addition of a further quantity of sodium chloride and is submitted to final carbonation which causes precipitation of sodium bicarbonate with substantially complete transformation of ammonia to ammonium chloride. The precipitated sodium bicarbonate is separated and the mother liquor is returned to the cycle with the addition of ammonia and sodium chloride. The cycle of operations is indefinitely repeated with the same liquid, retaining this liquid always at substantially the same initial volume.

Under the conditions specified, it is apparent that the heat disengaged by the solution of the gaseous ammonia cannot be effectively employed, because the liquor is already warm as a result of bicarbonation, and that in the operation another source of heat corresponding to the formation of ammonium carbonate is also rendered available at the wrong time, so that it is necessary to cool the liquid. The generation of heat in this manner involves a total loss in the process.

Furthermore, carbonation is carried out in two steps which complicates the operation and the final carbonation is unduly extended, since it ends in a liquid tending always to be poorer in ammonium mono-carbonate. This inconvenience is common not only to the process described, but also to the Solvay ammonia-soda process.

The process devised by applicant overcomes the inconvenience noted in the following manner. The heat of solution of the ammonia, instead of being a nuisance, becomes useful, that is to say, is freed at the moment when there is need of heating the liquid. The carbonation is carried out in a single step, and carbonation is carried out in a liquid which is very rich in ammonium carbonate until the termination of the reaction, and the rate of the bicarbonation is greatly increased.

The details of the process will be more readily understood by reference to the accompanying drawing in which the process is diagrammatically illustrated.

In the practice of alternate precipitation of sodium bicarbonate and ammonium chloride in accordance with the present invention, we separate the mother liquors containing essentially neutral ammonium carbonate and from which the major part of the ammonium chloride dissolved therein in a heated state has been precipitated by cooling to about 5° C., if we dispense with artificial cold or otherwise to within the limits of 15 to 18° C., in which case the quantity of ammonium chloride precipitated per cubic meter of liquid is diminished slightly in each cycle.

In this cold mother liquor, we then dissolve sodium chloride at the same time that it is made to absorb a quantity of gaseous ammonia equivalent to the quantity of sodium bicarbonate which it is desired to precipitate. The amount of ammonia ($NH_3$ and $(NH_4)_2CO_3$) in the liquid thus obtained is then greater than in the Solvay process, by the total quantity of neutral carbonate which pre-exists in the liquid and should be found again there after carbonation, as will appear hereafter. The heat disengaged by the absorption of ammonia is here useful, for it raises the liquid from its initial temperature 5 or 15° C., where it will absorb carbon dioxide very slightly to a temperature more favorable to this absorption and to the solubility of the salts.

We pass then to the operation of carbonation, but arrest the reaction when we have precipitated a quantity of sodium bicarbonate corresponding to the quantity of ammonia added in the preceding phase. This ammonia is thus transformed into ammonium chloride, while the remainder of the ammonia is retained in the liquid in the form of ammonium mono-carbonate, the function of which is to diminish the solubility in the cold of ammonium chloride. Moreover, since the liquid remains very alkaline until the end of the operation, the absorption of carbon dioxide is much facilitated. If, instead of using carbon dioxide from a lime kiln, we employ pure carbon dioxide or if we operate under a pressure of some atmospheres, or if, better still, we unite several of these means, the rapidity of absorption is further accelerated.

The absorber of carbon dioxide, which may be separated from the absorber of ammonia or combined with it, ought, in provision for absorption of carbon dioxide, to be supplied with an agitator permitting acceleration of the contact between the liquid and the gas. An absorber of the Boulouvard type may, for example, be employed. A refrigerating system employing water is preferably provided. The use of pure carbon dioxide and of an apparatus capable of withstanding pressure presents among other advantages that of reducing the loss of ammonia and of limiting the escape of the gas to simple periodic withdrawals directed preferably toward a washer. Or, on the other hand, in place of absorbers referred to, preference may be given to towers working continuously, particularly when we employ impure carbon dioxide.

We might not dissolve the salt during carbonation, but it is preferable to add it thus to increase the yield of each operation and the precipitation of sodium bicarbonate and of ammonium chloride per cubic meter of liquid in each cycle.

The sodium bicarbonate precipitated thus in a practically pure state is delivered with the liquid with which it is mixed to a filter, washed with a minimum of water and dried. The mother liquor, to which can be added a little ammonia for transforming the bicarbonates in solution in the state of neutral carbonates, is sent to a crystallizer provided with agitators and with cooling coils. The ammonium chloride is precipitated abundantly in fine crystals and in a state of purity by cooling to substantially 15 to 18° C., with the cooling water in the neighborhood of 5 to 10° C. in the event that we employ artificial cold. We recover the ammonium chloride on a filter and wash it with the minimum of water, that is to say, by simple displacement of the mother liquor. The wash water serves to bring the liquid to its initial volume. By reason of the rapidity of the carbonation, several crystallizers may be maintained and supplied from a single carbonator, particularly if we make use of pure carbon dioxide.

We recommence on the mother liquor from this separation the cycle of operations previously described and thus continue. Instead of adding successively ammonia and then carbon dioxide to the saline solution of neutral ammonium carbonate, we could add directly a suitable quantity of ammonium bicarbonate prepared in advance by using the wash water.

Other simple variations in the process will be apparent in carrying out the present invention, and various changes and modifications may be made therein without departing from the invention or sacrificing any of the advantages hereinbefore enumerated.

I claim:

1. A method of preparing sodium bicarbonate and ammonium chloride by precipitation from solution, which comprises executing the successive operations in presence of an excess of ammonium carbonate.

2. A method of preparing sodium bicarbonate and ammonium chloride by precipitation from solution, which comprises introducing ammonia to a liquor containing essentially ammonium carbonate and sodium chloride, carbonating the liquor until the ammonia thus added is converted into ammonium chloride, thereby precipitating sodium bicarbonate, separating the latter and cooling the liquor to separate ammonium chloride therefrom.

3. A method of preparing sodium bicarbonate and ammonium chloride by precipitation from solution, which comprises introducing ammonia to a liquor containing essentially ammonium carbonate and sodium chloride, carbonating the liquor until the ammonia thus added is converted into ammonium chloride, thereby precipitating sodium bicarbonate, separating the latter, cooling the liquor to separate ammonium chloride therefrom and returning the liquor for further treatment in the cycle.

4. A method of preparing sodium bicarbonate and ammonium chloride by precipitation from solution, which comprises introducing ammonia and sodium chloride to a liquor containing essentially ammonium carbonate, carbonating the liquor until the ammonia thus added is converted into ammonium chloride, thereby precipitating sodium bicarbonate, separating the latter and cooling the liquor to separate ammonium chloride therefrom.

5. A method of preparing sodium bicarbonate and ammonium chloride by precipitation from solution, which comprises introducing ammonia and sodium chloride to a liquor containing essentially ammonium carbonate, carbonating the liquor until the ammonia thus added is converted into ammonium chloride, thereby precipitating sodium bicarbonate, separating the latter, cooling the liquor to separate ammonium chloride therefrom and returning the liquor with addition of sodium chloride and ammonia to the cycle.

6. A method of preparing sodium bicarbonate and ammonium chloride by precipitation from solution, which comprises introducing ammonia to a liquor containing essentially ammonium carbonate and sodium chloride, utilizing the heat released by absorption of ammonia to heat the liquor to a temperature suitable for carbonation, introducing carbon dioxide to the liquor until the added ammonia is converted into ammonium chloride, separating the sodium bicarbonate thus precipitated and cooling the liquor to separate ammonium chloride therefrom.

7. A method of preparing sodium bicarbonate and ammonium chloride by precipitation from solution, which comprises introducing ammonia to a liquor containing essentially ammonium carbonate and sodium chloride, utilizing the heat released by absorption of ammonia to heat the liquor to a temperature suitable for carbonation, introducing carbon dioxide to the liquor until the added ammonia is converted into ammonium chloride, separating the sodium bicarbonate thus precipitated, cooling the liquor to separate ammonium chloride therefrom and returning the liquor for further treatment in the cycle.

8. A method of preparing sodium bicarbonate and ammonium chloride by precipitation from solution, which comprises introducing ammonia to a liquor containing essentially ammonium carbonate and sodium chloride, carbonating the liquor at the temperature to which it is raised by the absorption of ammonia until the ammonia thus added is converted into ammonium chloride, separating the sodium bicarbonate thus precipitated and cooling the liquor to separate ammonium chloride therefrom.

In testimony whereof I affix my signature.

GEORGES CLAUDE.